United States Patent
Barenbaum et al.

(10) Patent No.: US 8,604,263 B2
(45) Date of Patent: Dec. 10, 2013

(54) METHOD OF HYDROCARBONS AND HYDROGEN PRODUCTION FROM WATER AND CARBON DIOXIDE

(75) Inventors: Azary Aleksandrovich Barenbaum, Moscow (RU); Sumbat Nabievich Zakirov, Moscow (RU); Ernest Sumbatovich Zakirov, Moscow (RU); Vladimir Aleksandrovich Serebryakov, South Jordan, UT (US)

(73) Assignee: Galadigma LLC, South Jordan, UT (US)

( * ) Notice: Subject to any disclaimer, the term of this patent is extended or adjusted under 35 U.S.C. 154(b) by 0 days.

(21) Appl. No.: 13/578,222

(22) PCT Filed: Dec. 26, 2011

(86) PCT No.: PCT/IB2011/003347
§ 371 (c)(1),
(2), (4) Date: Aug. 9, 2012

(87) PCT Pub. No.: WO2012/090075
PCT Pub. Date: Jul. 5, 2012

(65) Prior Publication Data
US 2012/0315215 A1   Dec. 13, 2012

(30) Foreign Application Priority Data
Dec. 30, 2010   (WO) ................ PCT/RU2010/000811

(51) Int. Cl.
*C01B 3/02* (2006.01)
*C07C 1/00* (2006.01)
*C07C 1/02* (2006.01)

(52) U.S. Cl.
USPC .................. 585/733; 423/579; 423/648.1

(58) Field of Classification Search
USPC ................... 585/733; 423/579, 648.1
See application file for complete search history.

(56) References Cited

U.S. PATENT DOCUMENTS

| | | | | |
|---|---|---|---|---|
| 4,372,755 | A * | 2/1983 | Tolman et al. | 48/197 R |
| 5,516,742 | A | 5/1996 | Swanson | |
| 8,277,631 | B2 * | 10/2012 | Eastman et al. | 205/462 |
| 2008/0283411 | A1 * | 11/2008 | Eastman et al. | 205/343 |
| 2009/0001316 | A1 | 1/2009 | Hassan et al. | |

FOREIGN PATENT DOCUMENTS

JP   9132407 A   5/1997

OTHER PUBLICATIONS

International Search Report, PCT/IB2011/003347, dated Jun. 19, 2012, 4 pages.

* cited by examiner

*Primary Examiner* — Timothy Vanoy
(74) *Attorney, Agent, or Firm* — Jeffery M. Lillywhite, PC

(57) ABSTRACT

The disclosure relates to energy and the production of cost-effective power sources as hydrocarbons and hydrogen, as well as an oxidizer, such as oxygen. In an embodiment, the method of hydrocarbons, hydrogen and oxygen production includes a number of stages, including water saturation with carbon dioxide to form a saturated carbonated water; passing of the carbonated water through the reactor, which contains a catalyst, with the formation of hydrocarbons, hydrogen and oxygen, that subsequently flow into a separator; separation of reaction products from the initial carbonated water in the separator by liquid and gaseous phase separation, while hydrocarbons are separated from the liquid and gaseous phases, and hydrogen and oxygen are additionally separated from the gaseous phase.

25 Claims, 3 Drawing Sheets

METHOD OF HYDROCARBONS AND HYDROGEN PRODUCTION FROM WATER AND CARBON DIOXIDE

TECHNICAL FIELD

The present disclosure relates to energy and may be used for the production of such cost-effective power sources as hydrocarbons and hydrogen, as well as an oxidizer, namely oxygen. The proposed method for hydrocarbons, hydrogen and oxygen production uses carbonated water decomposition reaction widely occurring in nature.

BRIEF SUMMARY

Hydrocarbons and hydrogen belong to the group of substances with a high caloric value, which are used as the fuels in power industry and other industrial sectors.

There are a wide variety of industrial methods to synthesize and thus produce these substances. All these methods are however power consuming and involve considerable capital expenditures.

The modern methods for industrial synthesis of hydrocarbons are based on the following processes:

1) Oil, gas and gas hydrates fields prospecting, exploration and development, with further commercial processing of the extracted crude hydrocarbons.

The disadvantage of this method includes the high technological complexity and capital requirement for the hydrocarbon fuels production, resulting in a high unit cost.

2) Artificial hydrocarbons production using Fischer-Tropsch polycondensation synthesis (see Storch G., Golambik N., Anderson R. Hydrocarbons synthesis from carbon oxide and hydrogen. Moscow: Foreign literature, 1954) [1, p. 9]:

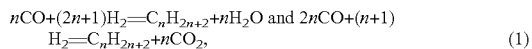

$$nCO+(2n+1)H_2 = C_nH_{2n+2}+nH_2O \text{ and } 2nCO+(n+1)H_2 = C_nH_{2n+2}+nCO_2, \quad (1)$$

where n is the number of carbon and hydrogen atoms in a hydrocarbon molecule.

The disadvantage of this method includes the use of syngas, which requires the preliminary rather costly hydrogen ($H_2$) and carbon oxide (CO) production, as well as undesirable formation of carbon dioxide ($CO_2$) as a result of the reactions. The cost of the produced synthetic oil exceeds the cost of the natural oil, and this fact predetermines the small amounts of its industrial production comparatively.

The main methods for the industrial scale hydrogen synthesis are:

1) Methane and Natural Gas Steam Reforming.

Today, nearly half of all hydrogen is produced by this method (see U.S. Pat. No. 6,682,714).

Water steam is mixed with methane ($CH_4$) over a catalyst at temperatures of 700-1000° C. and under high pressure. Steam and thermal power are required for the extraction of hydrogen from carbon in methane—this is just the process that takes place on the catalytic surfaces of the steam reformer units. The first phase of the process includes the decomposition of methane and water steam into hydrogen and carbon oxide. The second phase includes the conversion of carbon oxide and water into carbon dioxide and hydrogen. This reaction occurs at 200-250° C. The cost of hydrogen production under this method is approximately US$ 2-5 per 1 kg.

2) Coal Gasification.

It is one of the oldest methods for hydrogen production. Coal is heated over a catalyst at 800-1300° C. without air access. For example, (see U.S. Pat. No. 4,343,624) iron oxide ($Fe_3O_4$) is used as a catalyst for the gasification process. The first gas generator was constructed in Great Britain in the 1840s. According to the available information, USA intends to build a power generation plant under FutureGen project, which will run on coal gasification products. The electric power will be generated by fuel cells using hydrogen, produced in coal gasification process, as a fuel. In December 2007 the construction site was chosen for the first pilot FutureGen power generation plant. Power generation plant with the capacity of 275 MW will be constructed in Illinois. Up to 90% of $CO_2$ will be captured and stored in the plant. The cost of hydrogen production will amount to US$ 2-2.5 per 1 kg.

3) Water Electrolysis.

Water electrolysis is one of the most well-known and studied methods for hydrogen production. It ensures a direct product recovery (99.6-99.9% $H_2$) with a single technological phase. Water decomposes into hydrogen and oxygen at temperatures over 2500° C. Consequently, in all the processes of hydrogen production via water decomposition, significant amounts of oxygen as a byproduct are also produced. Electric power, through water electrolysis, accounts for 85.5% of hydrogen production costs.

Adding of sulphuric acid and the use of solar energy (see U.S. Pat. No. 7,241,950) in water electrolysis increase the cost effectiveness of the method. This method is also applied with the use of saline ocean water (see US application 2010/0213049), where galvanized steel is used as an anode and perforated aluminium plates are used as a cathode for electrolysis.

The method of water electrolysis has been used in countries with extensive resources of hydro power. The biggest electrochemical plants are situated in Canada, India, Egypt, and Norway. However, thousands of smaller plants have been constructed and are operating in many countries around the world.

This method is the most universal in the context of the use of the following prime energy sources: wind energy, solar energy, nuclear power, thermal water energy, biotechnology, naturally occurring degasation processes.

The methods for hydrogen production via reactions of metals and their oxides in aqueous media at high temperatures are also known. For example, stannum ($Sn/SnO_2$) has been used for this purpose in patents U.S. Pat. No. 3,821,362 and U.S. Pat. No. 3,979,505.

4) Biotechnologies.

Hydrogen is produced from biomass using thermo-chemical or biochemical methods. In case of the thermo-chemical method, biomass is heated without oxygen to the temperature of around 500-800° C. (from waste wood), which is significantly lower than the temperatures of the coal gasification process. $H_2$, CO and $CH_4$ are discharged in this process. The process cost is in the range of US$ 5-7 for 1 kg of hydrogen. In the future, through further developments, the cost could be potentially reduced to around US$ 3.0 per 1 kg.

In case of the biochemical process, hydrogen is produced by various bacteria or microorganisms and their derivatives (see US application 2009/0298151). The use of various enzymes is possible for the promotion of hydrogen production from polysaccharides (starch, cellulose), contained in biomass. The process takes place at 30° C. and at atmospheric pressures.

The resulted hydrogen costs nearly US$ 2 per 1 kg.

5) Naturally Occurring Degasation Processes

The article (see V. N. Larin, N. V. Larin. The use of mantle substance for hydrogen production//Chemistry and Life No. 10. 2000. p.46-51) [2] proposes the use of mantle substance for hydrogen production. To achieve industrial scale hydrogen production, the authors of this article suggested using the phenomenon of interior degasation. According to the available data, degasation products are predominated by methane and hydrogen. Carbon dioxide, nitrogen and other gases also evolve through degasation (see G. I. Voitov. Chemical aspect and scales of modern natural gases flow in various Earth's geostructural zones.//All-Union D. I. Mendeleiev Chemical Society Magazine. 1986. vol. 31. No. 5, p. 538) [3]. The authors believe, that hydrogen and methane that flow from the interior, evolve through the reactions of water with intermetallic compounds (silicides) and alloys based on Si, Mg, Fe and other chemical elements, contained in the Earth's mantle. This method is based on exploring and developing sites through deep well drilling where mantle substance approaches ground surface. The mechanism of hydrogen formation in the Earth's interior, offered by the authors is rather problematic. From a technological standpoint this method is not developed enough and presently the perspectives of hydrogen production by this means is not clear.

The disadvantage of all common hydrogen production methods is high energy consumption. The quantity of energy, contained in hydrogen as a fuel, amounts to just 25% of the energy consumed by its production. Additionally, in a number of processes the production of 1 kg of hydrogen is followed by the undesired formation of carbon dioxide in the amount of 7-22 kg.

The above disadvantages stimulate the search for less energy consuming and more environment friendly methods of hydrogen and hydrocarbons production.

The objective of this disclosure is to produce hydrocarbons, hydrogen and oxygen with a reduced power consumption, reduced production cost and reduced generation of environmentally harmful products.

This objective can be achieved, in some embodiments, by the proposed method for hydrocarbons, hydrogen and oxygen production with the use of carbon dioxide and water, by which:

water is saturated with carbon dioxide to form a carbonated water;

carbonated water is pumped through at least one reactor, that contains a catalyst, with the formation of hydrocarbons, hydrogen and oxygen, the substance subsequently flows into at least one separator;

in at least one separator the reaction products are separated from the initial carbonated water by means of gaseous and liquid phase separation, while hydrocarbons are separated from liquid and gaseous phases, hydrogen and oxygen are additionally separated from gaseous phase.

Metals, alloys, oxides or minerals, i.e. naturally occurring materials, can be used as catalysts. The choice of a catalyst is determined by the number of factors, specified in the detail below.

In some embodiments, the water is saturated with carbon dioxide to produce a carbonated water within at least one mixing unit. The use of several mixing units is reasonable in case of industrial scale production.

As mentioned above, in the liquid phase, liquid hydrocarbons are separated from water, and hydrogen, while in the gaseous phase, oxygen, low-molecular methane homologs and unconverted carbon dioxide are separated. At the same time, liquid and gaseous hydrocarbons, hydrogen and oxygen are directed for further processing, while carbonated water and carbon dioxide are recycled to the mixing unit.

Several reactors may be used, with a number of different or the same catalysts. Each reactor is coupled with at least one separator. It is possible to use several separators. In this case, each separator may serve in the separation of at least one reaction product, including the unconverted carbon dioxide and water.

It is reasonable to use filters, this is why the system may contain at least one filter, which will ensure the filtration of initial, intermediate or end products of the process.

For example, the mixing unit may be designed with at least one filter, at least one filter may be installed at the inlet and/or outlet of the reactor, and the separation unit may contain at least one filter.

The chemical reaction that occurs in the reactor can be represented by the following chemical equation:

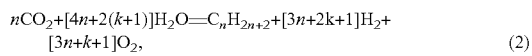

$$nCO_2 + [4n+2(k+1)]H_2O = C_nH_{2n+2} + [3n+2k+1]H_2 + [3n+k+1]O_2, \quad (2)$$

k—integer, greater than or equal to 0,
n—integer, greater than or equal to 1.

Equation (2) is set forth for the case of alkane formation, but the corresponding equations, based on Fischer-Tropsch reaction (see [1, p. 9]), may be derived for the process of other gas and oil series hydrocarbons production.

The question of oil and gas origin has not been solved to date. The variety of opinions on this issue exists in the scientific community. According to the biogenic theory of oil and gas formation, hydrocarbons originate from the organic matter of fossilized organisms, buried under the sedimentation rock. According to the abiogenic theory, oil and gas originate from hydrocarbon fluids and gases, which flow out of the deep Earth interior.

According to the third theory, the biospheric oil and gas formation model, which summarizes the first two theories (see A. A. Barenbaum. Mechanism of oil and gas accumulations formation//Reports of the Academy of Science. 2004. vol. 399. No. 6. p. 802-805) [4], oil and gas are the prerequisite products of the current geochemical carbon circuiting, represented by three interacting cycles on our planet.

The first cycle with duration of ~$10^8$-$10^9$ years, is connected with the deep mersion of carbon-bearing rocks into the Earth's mantle with the subduction of lithosphere plates. The second cycle, which is characterized by the duration of ~$10^6$-$10^7$ years, was induced by the transformation of the buried organic matter in the processes of sediment deposition. The third and shortest cycle of biospheric carbon circuiting, which comprises of ~40 years, is caused by the transfer of oxidized carbon of the ground surface biosphere into the Earth's crust by the meteoric water in the course of their climatic circulation. The meteoric water penetrate down to the crystalline basement (5-7 km deep and greater), and are the concomitant water in nearly all oil and gas fields (see V. M. Dobrynin, V. A. Serebryakov. Geological and geophysical methods for abnormal formation pressure forecast. Moscow: Nedra. 1989) [5].

The floating carbon passes through the ground surface many times, while being involved in the biospheric cycle. Carbon within either living organisms or mineral alternatives can alter its chemical form and isotopic composition. Above the ground surface, which serves as a geochemical barrier, carbon circulates mainly in form of $CO_2$, and below the ground surface it is reduced to hydrocarbons.

Carbon dioxide, which penetrates the Earth's crust together with meteoric water, is reduced there to hydrocarbons. Due to the low water solubility the latter precipitates as a separate phase, this forms oil-and-gas accumulations in geological trapping structures. All three cycles of carbon circuiting are interrelated and to an extent contribute to the formation of such accumulations.

In the recent epoch, hydrocarbons are mainly formed in the two last cycles, where the regional climatic water circulation plays the key role. Therefore, the oil and gas fields are formed in two ways:

1) Through the processes of catagenesis and geogenesis converting organic matter in sediment rock; and 2) As a result of polycondensation reaction of hydrocarbon synthesis from carbon dioxide, carried through the Earth's crust by meteoric water.

The first mechanism contributes to the complex hydrocarbon compounds (biomarkers) in oil, cognate to the organic matter wherefrom they originate. The second mechanism is responsible for the content of normal alkanes and isoalkanes, alkanoles and other hydrocarbon molecules with comparatively simple structure, which form the bulk of the oil. Subsequently, these hydrocarbons may undergo biological degradation and changes through the process of subsurface migration, both on the way towards geological traps and within the fields.

According to the inventors' estimates, the share of polycondensation synthesis, in the products of continental oil and gas fields amounts to nearly 90% [4, p. 803]. Due to the meteoric water involvement in the oil and gas formation with a cycle of about 40 years, hydrocarbon deposits replenishment is observed within producing fields, which have already be exploited for an extended period.

Such effects were reliably revealed, among others, within the Romashkino oil field (see R. Kh. Muslimov, N. F. Glumov, I. N. Plotnikova and others. Oil and gas fields—self developing and constantly renewable fields//Oil and gas geology. Special edition. 2004. p. 43-49) [6] and within the Shebelinka gas condensate field (see A. A. Barenbaum, S. N. Zakirov. Galactocentric paradigm and its effect on the theory and practice of field production//Oil industry. 2003. No. 3. p. 32-34) [7].

It is assumed that water is a very stable chemical compound, which is nearly incapable of spontaneous decomposition at temperatures and pressures that occur on the Earth's surface. Dissociation constant of water at a usual temperature is $10^{-14}$, and constant of water decomposition into hydrogen and oxygen is $10^{-83.1}$. This is why it is believed, that the water decomposition into hydrogen and oxygen is extremely improbable under common temperatures and pressure conditions without a significant energy input.

However, the lithogenesis processes occur dynamically in the Earth's crust with involvement of water, resulting in development of new mineral structures. At the same time, in a number of processes, a considerable amount of ground water is decomposed through the release of internal chemical energy during mineral synthesis (see S. L. Shvartsev. Water decomposition and synthesis in lithogenesis process//Geology and geophysics. 1975. No 5. p. 60-69) [8]. The key role in these processes is played by the free electrons, through whose intermediary, oil and gas hydrocarbons can be produced from water and completely oxidized carbon compounds in sedimentation rocks (see N. V. Cerskiy, V. P. Tsarev. Mechanisms of hydrocarbons synthesis from inorganic compounds in the upper layer of the Earth crust//Reports of the Academy of Science 1984. vol. 279. No. 3. C. 730-735) [9].

Water decomposition in the Earth's crust according to equation (2), together with oil and gas formation, is accompanied by atmospheric emission of large volumes of hydrogen and methane. Carbon dioxide and nitrogen also predominate as degasation products. Their occurrence is primarily caused by the prior trapping of these atmospheric gases by the water, circulating through the Earth's surface.

In recent years it was found that gas discharges occur everywhere (see N. V. Larin, A. B. Gorbatikov. Ring structures, resulting from hydrogen underflows//The Earth degasation: geotectonics, geodynamics, geofluids; oil and gas; hydrocarbons and life. Materials of the All-Russian Conference. Moscow: GEOS. 2010. p. 284-288) [10]. The most intensive degasation occurs through the splits in lithosphere plates, particular in the zones of the middle oceanic crests. Methane and other gases are subsequently involved in geochemical circulation and remain on the Earth, whereas the light hydrogen reaches the stratosphere and partially escapes into the space forming an extensive hydrogen crown and a tail around our planet. Without such a degasation and inflow as described the Earth's atmosphere would completely lose hydrogen in several years.

A number of facts give evidence that the phenomenon of water decomposition with hydrocarbons formation is extremely wide-spread in nature.

It is to be appreciated that the natural processes are energy efficient. Therefore the use of reaction (2) for industrial scale production of hydrocarbons, hydrogen and oxygen is more than feasible.

DETAILED DESCRIPTION

Experimental Evidence

The inventors have carried out a series of experiments, simulating hydrocarbon synthesis under mild temperature and pressure conditions of Earth's upper crust layers. The results of the experiments, together with the scientific and technical data available up to date, have lead to the conclusion that hydrocarbons, hydrogen and oxygen formation from carbon dioxide and water occurs in accordance with the experimentally proven reaction of polycondensation synthesis (2).

The experiments include passing carbonated water (carbon dioxide water solution) through a bulk medium, simulating meteoric water passing through a crustal rock with typical terrigenous and carbonaceous composition. An iron containing contaminant was added to the model media as a catalyst (iron turnings, powder oxides, iron dioxide, etc.). The experiments were carried out at room temperature and atmosphere pressures at the unit outlet.

Figure 1:
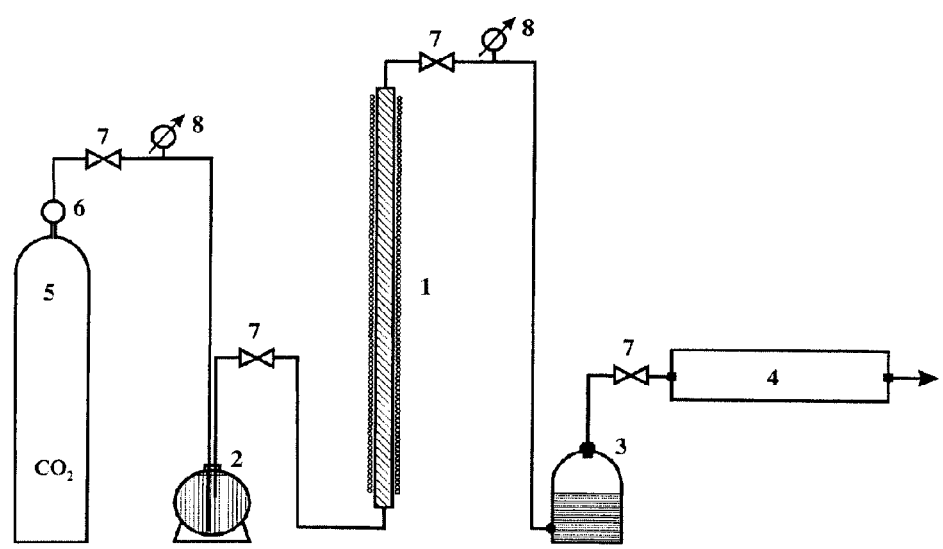
FIG. 1 is schematic diagram illustrating an exemplary pilot unit layout, in accordance with the present disclosure.

The developed laboratory unit is schematically represented on FIG. 1. The illustrated components are labelled as follows: 1—reaction column with heating unit, 2—mixing unit, 3—separator-collector, 4—gas chromatograph, 5—carbon dioxide cylinder, 6—reducer, 7—adjustable valve, 8—manometer.

The unit comprised of a reaction column 1, filled with the bulk model substance. Carbonated water with predetermined concentration of dissolved carbon dioxide was fed to the reaction column inlet from mixing unit 2. At the outlet of the reaction column liquid flowed to the separator-collector 3, where gaseous reaction products were separated from the liquid, with the subsequent analysis of gaseous products with the gas analyzer 4. A tank with the capacity of 20 liters, which withstands pressure of 15 atm, was used as a mixing unit. Carbon dioxide cylinder 5 was used for the preparation of carbonated water. Carbon dioxide concentration in the solution was adjusted through pressure and the duration of water saturation with carbon dioxide in the mixing unit, Both distilled water and artesian well water were used in the experiments. Pressure values of carbon dioxide, fed to the unit, varied over the range of 0.5 and 10 atm, ensuring the regulation of the carbonated water flow rate through the reaction column. The reaction column is designed as a 1 meter long piece of plastic tube with inner diameter of 19 mm. On the outside of the tube an electric heating coil was installed for heating in separate experiments. Field chromatograph "Khromoplast-001", designed for the measurement of hydrogen, methane, ethane, propane, isobutane, butane, isopentane and pentane content in the gas mixture, served as a gas analyzer. The analyzer had two chromatographic columns of various lengths, which allowed the determination of hydrogen and the above mentioned gases with the accuracy of ~0.01%.

Figure 2:
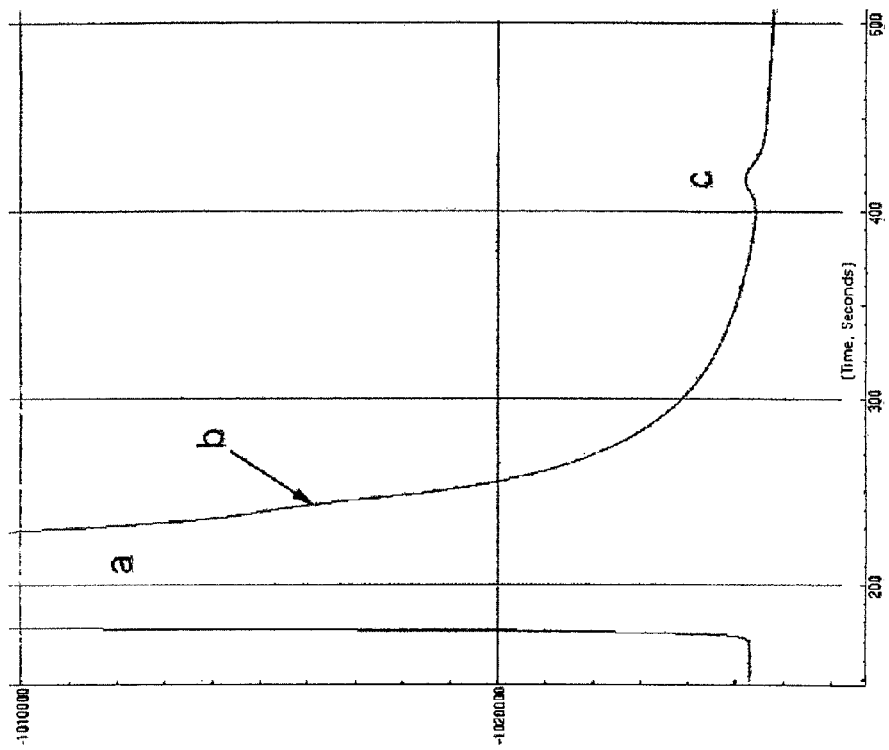
FIG. 2 is an illustration of chromatograms of gases produced in reaction (1) with low (A) and high (B) hydrogen output, in accordance with the present disclosure.
Figure 2:
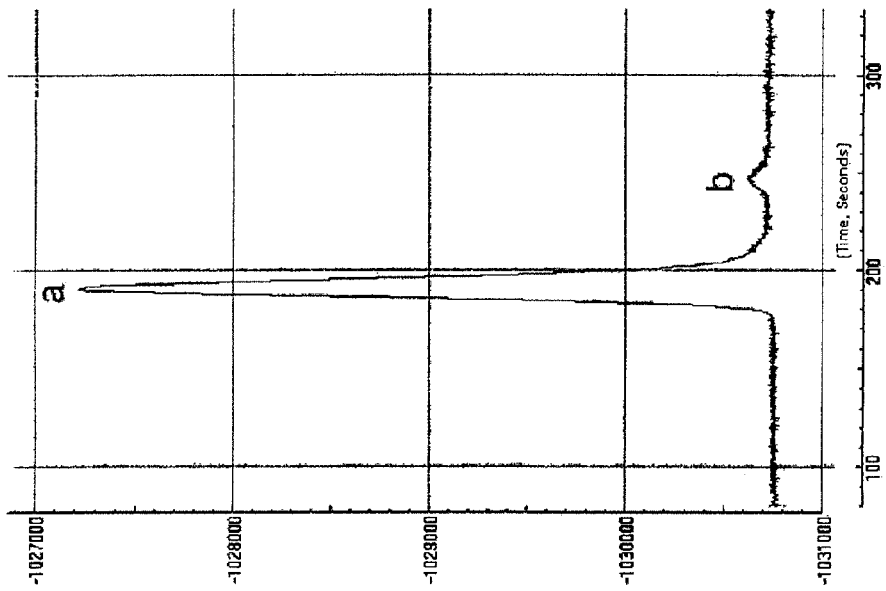

The experiments demonstrated that water decomposition with the formation of light hydrocarbon gases occurs as a result of passing carbonated water through the model medium. The formation of hydrogen and hydrocarbons, in particular methane ($CH_4$), ethane ($C_2H_6$), butane and isobutabe ($C_4H_{10}$) was recorded by the chromatograph in the composition of the gaseous phase, which was accumulated in the separator. Rapid oxidation of the iron, comprised in the model medium as a catalyst, indicated significant formation of oxygen in the reaction. FIG. 2 shows the chromatograms of gases produced in reaction (1) with low (A) and high (B) hydrogen output. The following spikes are identified in the chromatograms: a—hydrogen, b—methane, and c—ethane. In case of high output the hydrogen spike overlaps the methane spike.

$CO_2$ concentration in the carbonated water, flow rate of this water through the reaction column, catalyst type and quantity, markedly affected hydrogen and hydrocarbon gases production.

Methane and its homologs, as well as hydrogen, detected in the experiments, demonstrate strong evidence that through a natural catalytic reaction of the crustal sedimentation rock with meteoric water filtration, water decomposes into hydrogen and oxygen together with polycondensation synthesis of oil and gas hydrocarbons.

Description of the Reaction Formula

The reactions of hydrocarbons polycondensation synthesis from carbon oxides and hydrogen are widely spread in nature. The Fischer-Tropsch synthesis of hydrocarbons from carbon oxide and hydrogen is used in the industrial scale hydrocarbon production.

Among other similar polycondensation reactions, hydrocarbons synthesis with input of carbon oxide and water may occur according to the Kölbel-Engelhardt chemical equation:

$$(3n+1)CO+(n+1)H_2O = C_nH_{2n+2}+(2n+1)CO_2 \qquad (3)$$

The Fischer-Tropsch hydrocarbons synthesis is an exothermic process. Therefore, the reaction (1) output is significant even at room temperature and high heat generation occurs (see [1, p. 10]).

Another important peculiarity of reactions (1) and (3), detected by the example of the Fischer-Tropsch synthesis, includes the fact that the distribution of the produced hydrocarbons, which are mainly comprised of alkanes, alkenes, alkanols and alkanales with carbon number value of 1 to 100 and higher, is in many cases governed by the Anderson-Schulz-Flory equation (see L. S. Glebov, G. A. Kliger. Molecular weight distribution of Fischer-Tropsch synthesis products//Chemistry progress. 1994. vol. 63. No. 2. p. 192-202) [11, p. 193]:

$$\lg(g_n/n) = \lg(\ln^2 \alpha) + n \lg \alpha \qquad (4)$$

where $g_n$—weight fraction of hydrocarbons with n carbon atoms in a molecule, α—constant coefficient (0<α≤1).

The article (see A. A. Barenbaum, E. A. Ablia. Molecular weight distribution of oil normal alkanes as proof of their polycondensation synthesis//Organic mineralogy: Materials of III Russian conference with international participation. Syktyvkar: Geoprint. 2009. p. 74-77) [12, p. 75, 76] shows that hydrocarbons distribution of crude non-biodegradated oil also complies with the formula (4).

Figure 3:
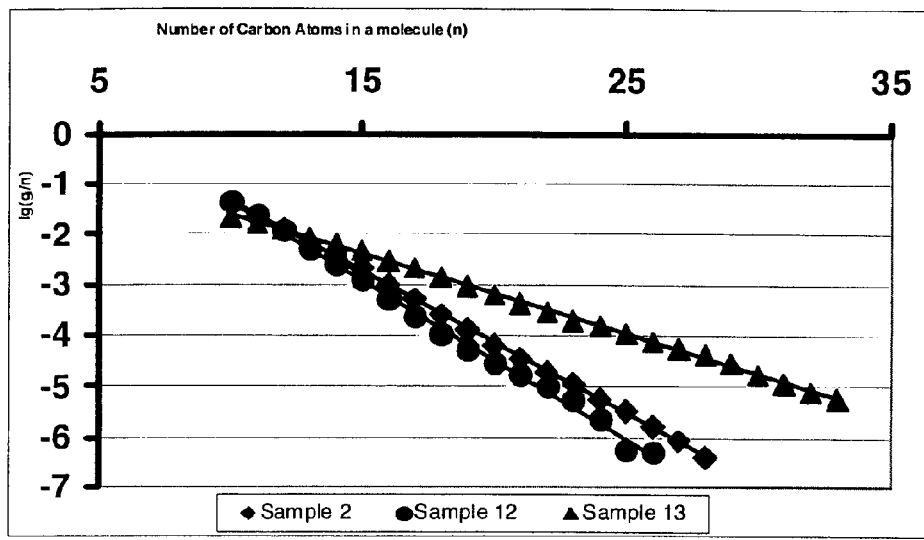
FIG. 3 is a chart illustrating the molecular-mass distribution of normal alkanes in the coordinate system of Anderson-Schulz-Flory equation for oil sample (sample 13) and two other condensate samples (samples 2 and 12), in accordance with the present disclosure.

As a confirmation of this conclusion, FIG. 3 illustrates the distribution of normal alkanes ($C_nH_{2n+2}$ formula) in the coordinated system of the equation (4) for one oil sample and two condensate samples, starting with carbon number value n=10. The analysis results of samples 2, 12 and 13 are taken from the table on page 75 of the article [12]. The studies were carried out with the use of the Trace Ultra Thermo Finnigan chromatograph, on a Sol-Gel 1-MS column, with a neutral phase, at a length of 60 m, with a diameter of 0.25 mm, layer of 0.25 mn, detector temperature of 320° C., evaporator temperature of 300° C., and temperature condition of 3° C./min. The hydrocarbons examination and identification were carried out with the use of the Thermo Finnigan MAT 900 high resolution spectrometer (with Trace GC chromatograph) with the same column and temperature schedule as outlined above.

Oils from various fields were studied, mainly from the deposits of early Palaeozoic age, superposed at a depth of over 2 km. The oils' average specific gravity is about 0.85 g/cm³ and its polar fractions content is low (less than 10%). While normal methane hydrocarbons (over 80%) predominate in these oils, the share of aromatic hydrocarbons is also significant. Very light oils, composed mainly of normal series hydrocarbons, were also studied.

It was observed for the large panel of oils, that the coefficients α in the distribution of oils alkanes and in products of the Fischer-Tropsch synthesis, when utilising iron-containing catalyst, have the same value.

This fact predetermined the choice of iron as a primary catalyst for the experiments.

The conducted experiments provided the conclusion that the process of carbonated water decomposition with the formation of simple hydrocarbons, observed by the inventors, is described in the best way by chemical equation (2):

$$nCO_2+[4n+2(k+1)]H_2O = C_nH_{2n+2}+[3n+2k+1]H_2+[3n+k+1]O_2.$$

This reaction is analogous from the structural point of view to the reactions of Fischer-Tropsch (1) and Kölbel-Engelhardt (3) syntheses. The common feature of the three reactions is the synthesis of hydrocarbons. Its main difference lies in the fact that its initial reagent is carbon dioxide $CO_2$, and not carbon oxide CO, and the products of water decomposition, hydrogen and oxygen, are formed at the outlet.

Moreover, reactions (1) and (3) occur in a gaseous phase, while reaction (2) occurs in an aqueous phase.

In the derivation of equation (2) the inventors considered, that hydrogen and hydrocarbons—methane ($CH_4$), ethane ($C_2H_6$), butane and isobutane ($C_4H_{10}$)—were recorded by the chromatograph in the composition of the gaseous phase, that has been accumulated in the separator. The second product of water decomposition—oxygen, that could not be detected by means of chromatograph in the experiment, contained in the collected gas samples, was analyzed in a chemical laboratory. Rapid oxidation of iron turnings, which served as a catalyst in separate experiments, also indicated oxygen formation.

Therefore, the produced oxygen not only occurred in free state, but also took a significant part in iron catalyst oxidation. This effect may be reduced by the use of other types of catalysts.

Another difference of reaction (2) from the Fischer-Tropsch and Kölbel-Engelhardt synthesis reactions includes the fact that the Gibbs free energy value for the reagents of these reactions turned out to be higher than that of its products. This makes these reactions thermodynamically unfavourable and thus precludes their spontaneous occurrence without additional energy input. In this case, the defining role in water molecule destruction and hydrocarbons formation is played by electrochemical processes with the participation of free electrons, which are generated at the moment of water contact with the rock minerals, as it was experimentally proved by other authors (see [9]).

With the use of chemical equation (2) disclosure a number of theoretical estimates were made for the practical implementation of the disclosure.

Equation (2) implies that 2.75 t of $CO_2$ and at least 6.75 t of water are consumed for the production of one ton of $CH_4$, 0.5 t of hydrogen and 8.0 t of oxygen. With the increase of the hydrocarbons' molecular weights, these estimates do not change significantly.

For the theoretical estimation of full hydrogen and hydrocarbon output, the right and the left parts of the equation (2) are summed according to n, having set the produced hydrocarbons' mass distribution function.

Figure 4:
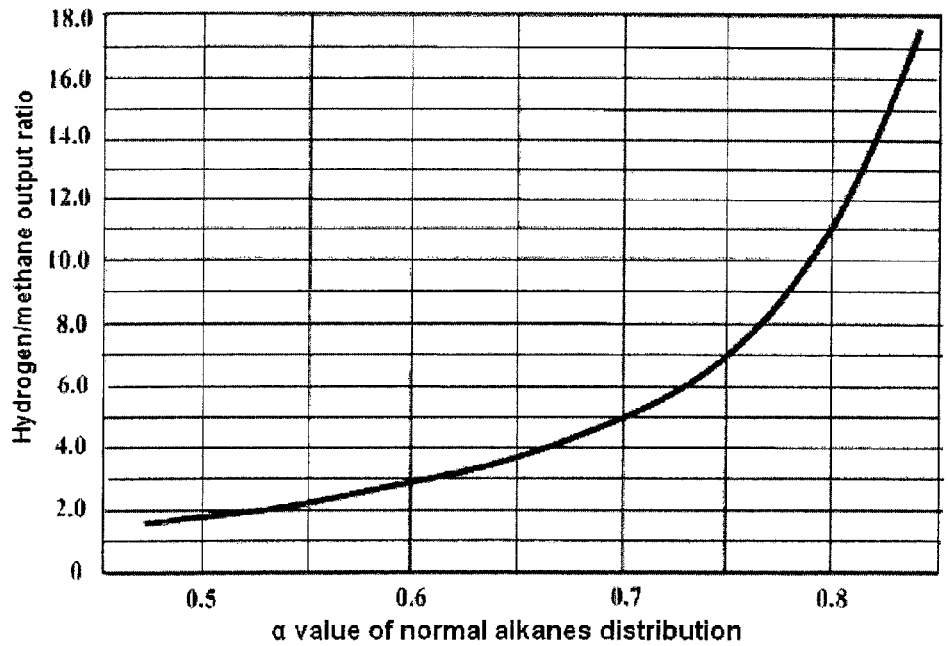
FIG. 4 is a schematic illustration of hydrogen output versus methane output as a function of normal alkanes parameter value of $\alpha$, produced in the reaction (2), in accordance with the present disclosure.

The assumption, that hydrocarbons' distribution complies with Anderson-Schulz-Flory equation (4), FIG. 4 illustrates the calculated ratio of hydrogen and methane outputs as a function of $\alpha$. The diagram shows that the oil specific range of cc changes from 0.5 to 0.85 and the $H_2$ output always exceeds the $CH_4$ output. Moreover, with the increase of $\alpha$, the exceedance of $H_2$ over $CH_4$ increases from 2 to up to 20 times.

According to the experiments' results, $\alpha$ value of the assumed molecular mass distribution of n-alkanes was determined from the diagram (FIG. 4) based on the measured quantities of formed $H_2$ and $CH_4$ (see FIG. 2-$a$). The $\alpha$ value turned out to be around 0.7. This value closely matches the comparable value of the Fischer-Tropsch synthesis products, when utilising iron-containing catalysts, which equals to 0.65±0.05 (see [11, p. 199]).

Such a result provides further evidence on the correctness of the determined chemical equation (2).

Thus, the realized experiments prove, that the decomposition of water molecules with the subsequent formation of oil and gas series hydrocarbons, hydrogen and oxygen, occurs during the inflow of carbonated surface water to the Earth's crust sedimentary mantle, in course of filtration of these water through porous, vuggy and permeable rocks. Moreover, these processes occur even at low temperatures and pressures without input of additional energy.

This conclusion logically explains a number of observed but not yet well understood phenomena. Among such phenomena, inventors primary denote the rapid (remarkable in 30-50 years) replenishment of oil and gas fields, significant variability of oils' chemical composition, and the occurrence of a natural and technogenic cosmogenous radio-isotope, $^{14}C$, in the oil.

Another phenomenon the inventors associate with the detected process, widely spread on our planet, is the constant large scale gas discharges through the Earth's surface. Methane, hydrogen, carbon dioxide and nitrogen predominate among these gases.

These gases' origination can also be explained by the penetration of meteoric water into the Earth's crust. Thus, if oxygen, formed in reaction (2), is quickly trapped by the rocks, then the large quantities of formed methane and hydrogen, together with the trapped water, air nitrogen and non-converted carbon dioxide flow into the atmosphere. The most intensive flow to the surface occurs through the splits in lithosphere plates, in the zones of middle oceanic crests.

For lack of a better idea, Earth's degasation is explained by $H_2$ and $CH_4$ flowing out of the Earth's core (see A. A. Marakushev, S. A. Marakushev. Hydrogen breath of the Earth—its origin, geological and biological consequences//International Scientific Journal for Alternative Ecology No. 1(57) 2008. 156-174) [13]. The authors of this article believe that these gases have remained within the Earth's core from the moment of Earth's formation. However, such an explanation disagrees with the modern concept of cosmochemistry and geophysics, on the conditions of our planet's formation and its internal structure. $H_2O$ molecule decomposition within the Earth's crust with the subsequent formation of hydrocarbons, allows for the rejection of this hypothesis, that hydrogen and other gases are present within the Earth's core. This hypothesis is inadequate from a physical standpoint.

The disclosure justifies the possibility and the feasibility of implementing this natural process for hydrogen, hydrocarbons and oxygen production.

Therefore, the objectives of the disclosure, namely the reduction of the power consumption and the cheapening of industrial scale hydrocarbons, hydrogen and oxygen production, are achieved through the use of reaction (2), where carbon dioxide and water serve as the reagents, and the substances used in the industrial scale hydrocarbons Fischer-Tropsch synthesis (see [1, p. 153]), serve as the catalysts.

Based on the available data the inventors believe, that not only Fe, but also other metals, such as, Co, Cu, Ag, Mn, and their oxides: MgO, CaO, SrO, BaO, BeO, $Al_2O_3$, $La_2O_3$, $CeO_2$, $ThO_2$, $UO_2$, $U_3O_8$, $SnO_2$, $Bi_2O_3$, CdO, ZnO, as well as natural minerals, in particular clays and zeolites, can be used as effective catalysts in the reaction (2). Moreover, water-soluble catalytic substances can be added to the water, used in the reaction.

It is to be appreciated that the one aspect of the present disclosure solves simultaneously two challenging and global problems:

1) Cheap production of hydrocarbons, hydrogen and oxygen, required for the modern industry development; and 2) The disposal of carbon dioxide industrial waste, which pollutes the atmosphere and affects our planet's climate.

The most similar to the proposed method for hydrocarbons synthesis, from the technical implementation, are Fischer-Tropsch reaction (1) and hydrogen production by the method of methane steam conversion.

All these methods require catalysts for the product formation.

In the proposed method, as well as in the Fischer-Tropsch and Kölbel-Engelhardt hydrocarbons synthesis, hydrocarbons are produced from oxides of carbon and hydrogen. The difference is that the reagents for Fischer-Tropsch synthesis are carbon oxide and non-oxidized hydrogen, and $H_2O$ and $CO_2$ are produced together with hydrocarbons at the reaction outlet; the reagents for Kölbel-Engelhardt synthesis are carbon oxide and water, and the additional reaction product is carbon dioxide only, while in the proposed method $CO_2$ and $H_2O$ are the reagents, and $H_2$ and $O_2$ together with hydrocarbons are the products.

In such a case, the need for hydrogen and carbon oxide production, requiring a significant energy input and investment, is completely eliminated.

A distant similarity can be found between the proposed method for hydrogen production and its formation in the method of methane steam conversion. This method is simply represented by the following chemical equation:

$$CH_4 + 2H_2O = CO_2 + 8H_2 \quad (5)$$

In this method one useful product, hydrogen, is produced from another useful product, methane ($CH_4$), and environmentally harmful $CO_2$ is formed. In the proposed method methane and carbon dioxide change places—$CO_2$ becomes a reagent, and $CH_4$, as hydrogen, becomes a useful reaction product.

It must also be mentioned, that the method of methane steam conversion, as well as other known methods for hydrogen production, are very energy-consuming and costly. The proposed engineering solution compares favourably to the other known methods from this standpoint.

Another distinction of the method is the fact that Fischer-Tropsch synthesis and methane steam conversion occurs in a gaseous phase, while the proposed method for hydrocarbons and hydrogen production occurs in an aqueous phase.

DESCRIPTION OF EMBODIMENT

Figure 5:
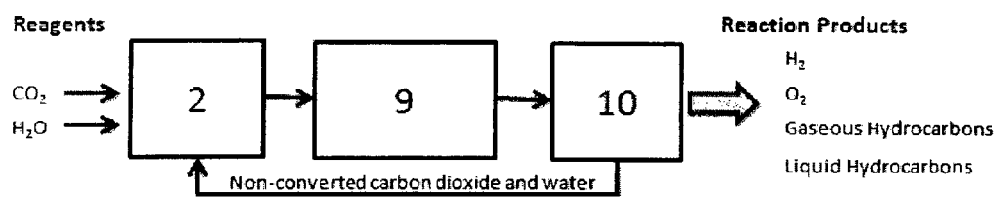
FIG. 5 is a schematic block diagram of an exemplary industrial scale unit for hydrocarbons, hydrogen and oxygen production from carbon dioxide and water, in accordance with the present disclosure.

Based on the proposed method, an exemplary embodiment of the unit for industrial scale production of hydrocarbons, hydrogen and oxygen production is represented by FIG. 5.

The exemplary unit comprises the following components:
mixing unit 2, designed for the preparation of carbonated water by means of carbon dioxide dissolving in water;
reactor 9, filled with a catalytic substance, passing carbonated water through the reactor decomposes as hydrogen and oxygen, and hydrocarbons are formed.
separator 10, where the solution, which passed through the reactor, is separated into gaseous and liquid compounds, with the subsequent separation of the reaction products: hydrogen, oxygen, methane and other hydrocarbons, and the separation of these useful components from the remained carbon dioxide.

In an embodiment, the unit operation principle includes the following: water and carbon dioxide flow to the mixing unit through separate pipelines, carbon dioxide is fed under certain pressure, for example, in the injection mode. A purpose of the mixing unit is to ensure the highest level of water saturation with carbon dioxide. Consequently, the mixing unit can include additional devices for mixing the carbon dioxide solution into the water.

In order to avoid infiltration of undesirable mechanical or chemical impurities into the mixing unit, water and carbon dioxide may be preliminarily filtered.

Carbonated water, prepared in the mixing unit, is fed under a certain pressure to the reactor. This is where it becomes saturated with gaseous ($H_2$, $O_2$, $CH_4$ and its homologs up to $C_5$ inclusive) and liquid (hydrocarbons from $C_6$ and higher) reaction products as the result of a catalytic process.

The overall reactor dimensions and design, catalyst type, reaction temperature, as well as pressure and the solution flow rate through the reactor may be determined based on the requirements to achieve the maximum hydrogen and hydrocarbons output with the parallel reduction of non-converted carbon dioxide at the outlet of the reactor.

Carbonated water then passed through the reactor. Following the reaction, the products flow into the separator. There it undergoes the separation process into liquid and gaseous phases, out of which the useful products are separated: hydrogen, oxygen, methane and its lower homologs—from the gaseous phase, and hydrocarbons ($C_{5+}$)—from the liquid phase. These components are then directed to the consumer for the subsequent processing and consumption, and the remaining water and non-converted carbon dioxide flow into the mixing unit through a pipeline for their recycled use.

In such a way the exemplary unit, whose block-diagram is represented by FIG. 5, allows for the production of hydrocarbons, hydrogen and oxygen from carbon dioxide and water in a technologically closed cycle, ensuring the cost-effective transformation of an environmentally harmful carbon dioxide into the main types of modern fuels.

The respective industrial scale unit may also include additional equipment, such as pumps, compressors, filters, shutoff and control valves, sensors and counter devices for the control, adjustment and optimization of the technological process.

Technological equipment and catalysts, which are usually used in the known methods for hydrocarbon synthesis and oxygen production, can also be used in the implementation of this disclosure.

Based on the gathered experience of hydrocarbon production by Fischer-Tropsch synthesis and hydrogen production by methane conversion method, it can be assumed, that the fuel production process from carbon dioxide and water can be controlled. It can be ensured by the optimal choice of the catalyst, temperature and pressure conditions, which may be experimentally optimized with consideration for the required reaction products.

It is to be appreciated that the change of catalysts composition, ratio of carbon oxide and hydrogen in syngas and conditions of catalytic process may result in the production of either, mainly methane (up to 80-90%) or a mixture of light hydrocarbons $C_1$-$C_5$ and hydrocarbons $C_5$-$C_{18+}$ with various content of normal alkanes, olefins, iso-paraffins and aromatic compounds in a vast range of 5 to 40-50% (see K. G. Ione. On the role of hydrogen in the Earth technogenous evolution. Novosibirsk. 2003) [13, p. 43].

The invention claimed is:

1. A method for producing hydrocarbons, hydrogen, and oxygen from carbon dioxide and water, the method comprising:
    providing carbonated water comprising water and carbon dioxide;
    reacting, in at least one reactor, water and carbon dioxide in the carbonated water in the presence of a catalyst to form a reaction product, without requirement of heating the reagents to initiate the reaction, the reaction product comprising hydrocarbons, hydrogen, and oxygen; and
    directing an exit stream from the reactor to a separator unit, the exit stream comprising unreacted carbonated water and the reaction product,
    wherein the reaction product is separated from the unreacted carbonated water in the separator unit.

2. The method according to claim 1, wherein the carbonated water reacts in the at least one reactor according to the reaction:

$$nCO_2+[4n+2(k+1)]H_2O = C_nH_{2n+2}+[3n+2k+1]H_2+[3n+k+1]O_2,$$

wherein k is an integer greater than or equal to 0 and n is an integer greater than or equal to 1.

3. The method according to claim 1, wherein the catalyst comprises a metal, an alloy, an oxide, or a mineral.

4. The method according to claim 1, wherein providing carbonated water comprises mixing water and carbon dioxide in at least one mixing unit, and the method further comprises directing the carbonated water from the mixing unit to the at least one reactor.

5. The method according to claim 4, wherein directing the carbonated water comprises directing the carbonated water through at least one filter.

6. The method according claim 4, wherein providing carbonated water further comprises directing water through at least one filter and into the mixing unit via an inlet.

7. The method according to claim 4, wherein providing carbonated water further comprises directing carbon dioxide through at least one filter and into the mixing unit via an inlet.

8. The method according to claim 1, wherein the separator unit is operable to receive the exit stream from the at least one reactor and separate the received stream into a gaseous phase and a liquid phase, the liquid phase comprising hydrocarbons and carbonated water, the gaseous phase comprising hydrocarbons, hydrogen, oxygen, low molecular weight methane homologs, and non-converted carbon dioxide.

9. The method according to claim 8, wherein the hydrocarbons in the liquid and gaseous phases, the hydrogen in the gaseous phase, and the oxygen in gaseous are extracted, and the carbonated water in the liquid phase and the carbon dioxide in the gaseous phase are recycled to a mixing unit.

10. The method according to claim 1, wherein water and carbon dioxide are reacted in a plurality of reactors.

11. The method according to claim 10, wherein water and carbon dioxide are reacted in the presence of the same catalyst in each reactor.

12. The method according to claim 10, wherein water and carbon dioxide are reacted in the presence of different catalysts in different reactors.

13. The method according to claim 10, wherein the exit stream of each reactor is directed to the separator unit.

14. The method according to claim 13, wherein the separator unit comprises a plurality of separator vessels, and the exit stream of each reactor is directed to a different separator vessel.

15. The method according to claim 1, wherein the separator unit comprises a plurality of separator vessels.

16. The method according to claim 15, wherein a separator vessel of the separator unit is configured to separate liquid hydrocarbons from the liquid phase.

17. The method according to claim 15, wherein a separator vessel of the separator unit is configured to extract non-converted carbon dioxide, oxygen, hydrogen, or gaseous hydrocarbons.

18. The method according to claim 1, wherein directing an exit stream comprises directing the exit stream through a filter.

19. The method according to claim 1, further comprising directing a stream from the separator unit through a filter.

20. The method according to claim 19, wherein the stream comprises carbonated water.

21. The method according to claim 19, wherein the stream comprises carbon dioxide, oxygen, hydrogen, or hydrocarbons.

22. A method for producing hydrocarbons, hydrogen, and oxygen from carbon dioxide and water, the method comprising:

providing carbonated water comprising water and carbon dioxide;

reacting, in at least one reactor, water and carbon dioxide in the carbonated water in the presence of a catalyst to form a reaction product, with adjusting temperature, pressure and reagents quantities including via the mixing unit to control the reaction, the reaction product comprising hydrocarbons, hydrogen, and oxygen; and directing an exit stream from the reactor to a separator unit, the exit stream comprising unreacted carbonated water and the reaction product, wherein the reaction product is separated from the unreacted carbonated water in the separator unit.

23. The method according to claim 22, wherein the carbonated water reacts in the at least one reactor according to the reaction:

$$nCO_2+[4n+2(k+1)]H_2O = C_nH_{2n+2}+[3n+2k+1]H_2+[3n+k+1]O_2,$$

wherein k is an integer greater than or equal to 0 and n is an integer greater than or equal to 1.

24. The method according to claim 22, wherein providing carbonated water comprises mixing water and carbon dioxide in at least one mixing unit, and the method further comprises directing the carbonated water from the mixing unit to the at least one reactor.

25. A method for producing hydrocarbons, hydrogen, and oxygen from carbon dioxide and water, the method comprising:

providing carbonated water comprising water and carbon dioxide;

reacting, in at least one reactor, water and carbon dioxide in the carbonated water in the presence of a catalyst to form a reaction product, without the requirement of using magnesium carbonate/hydroxide complex to initiate the reaction, the reaction product comprising hydrocarbons, hydrogen, and oxygen; and directing an exit stream from the reactor to a separator unit, the exit stream comprising unreacted carbonated water and the reaction product, wherein the reaction product is separated from the unreacted carbonated water in the separator unit.

* * * * *